(12) United States Patent
Kim

(10) Patent No.: US 12,280,773 B2
(45) Date of Patent: Apr. 22, 2025

(54) APPARATUS FOR CONTROLLING LANE KEEPING, VEHICLE SYSTEM HAVING THE SAME AND METHOD THEREOF

(71) Applicants: Hyundai Motor Company, Seoul (KR); Kia Corporation, Seoul (KR)

(72) Inventor: Dong Hyuk Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 418 days.

(21) Appl. No.: 17/468,254

(22) Filed: Sep. 7, 2021

(65) Prior Publication Data

US 2022/0289182 A1   Sep. 15, 2022

(30) Foreign Application Priority Data

Mar. 12, 2021 (KR) .................. 10-2021-0032849

(51) Int. Cl.
*B60W 10/20* (2006.01)
*B60W 30/12* (2020.01)
*B60W 30/18* (2012.01)
*B60W 40/06* (2012.01)
*B60W 50/00* (2006.01)
*B60W 50/10* (2012.01)

(52) U.S. Cl.
CPC ...... *B60W 30/12* (2013.01); *B60W 30/18163* (2013.01); *B60W 2540/18* (2013.01); *B60W 2552/30* (2020.02); *B60W 2554/4041* (2020.02); *B60W 2554/4042* (2020.02); *B60W 2554/4045* (2020.02); *B60W 2554/802* (2020.02); *B60W 2710/06* (2013.01); *B60W 2710/18* (2013.01); *B60W 2710/20* (2013.01)

(58) Field of Classification Search
CPC .......... B60W 30/12; B60W 30/18163; B60W 2540/18; B60W 2552/30; B60W 2554/4041; B60W 2554/4042; B60W 2554/4045; B60W 2554/802; B60W 2710/06; B60W 2710/18; B60W 2710/20; B60W 2520/10; B60W 50/10; B60W 2554/804; B60W 10/20; B60W 40/06; B60W 40/10; B60W 2050/0005; B60W 2050/0049; B60W 2420/00; B60W 2510/202; B60Y 2300/12; B60Y 2400/30
USPC ......................................................... 701/25
See application file for complete search history.

(56) References Cited

U.S. PATENT DOCUMENTS

| | | |
|---|---|---|
| 8,521,363 B2 | 8/2013 | Kataoka |
| 9,950,740 B2 | 4/2018 | Sato et al. |
| 10,421,491 B2 | 9/2019 | Shimizu |

(Continued)

FOREIGN PATENT DOCUMENTS

| | | | |
|---|---|---|---|
| JP | 2001206237 A | * | 7/2001 |
| JP | 2007326447 A | | 12/2007 |

(Continued)

*Primary Examiner* — Rachid Bendidi
*Assistant Examiner* — Hossam M Abd El Latif
(74) *Attorney, Agent, or Firm* — Fox Rothschild LLP

(57) ABSTRACT

A lane keeping control apparatus and, a vehicle system including the same are provided. The lane keeping control apparatus includes a processor that supports a lane replacement mode by determining an intention of a driver based on a steering direction of the driver and a steering torque value of the driver during lane keeping control; and a storage that stores data and algorithms driven by the processor.

15 Claims, 16 Drawing Sheets

(56) References Cited

U.S. PATENT DOCUMENTS

| | | | |
|---|---|---|---|
| 10,710,632 B2 | 7/2020 | Sato et al. | |
| 2009/0067675 A1* | 3/2009 | Tan | G01S 13/931 |
| | | | 382/104 |
| 2009/0171533 A1 | 7/2009 | Kataoka | |
| 2010/0045452 A1* | 2/2010 | Periwal | B60Q 9/00 |
| | | | 340/439 |
| 2015/0149039 A1* | 5/2015 | Fu | B62D 15/025 |
| | | | 701/41 |
| 2017/0003683 A1 | 1/2017 | Sato et al. | |
| 2018/0023951 A1* | 1/2018 | Seo | G01B 11/275 |
| | | | 356/138 |
| 2018/0141588 A1 | 5/2018 | Shimizu | |
| 2018/0178801 A1* | 6/2018 | Hashimoto | B62D 15/025 |
| 2018/0201314 A1 | 7/2018 | Sato et al. | |
| 2018/0293894 A1* | 10/2018 | Zhang | G08G 1/167 |
| 2019/0092321 A1* | 3/2019 | Shimizu | B60W 30/09 |
| 2019/0102840 A1* | 4/2019 | Perl | G06N 3/08 |
| 2019/0206254 A1* | 7/2019 | Tao | B60W 30/0956 |
| 2019/0315367 A1* | 10/2019 | Um | B60W 30/12 |
| 2020/0108867 A1 | 4/2020 | Eom | |
| 2020/0118442 A1* | 4/2020 | Iihoshi | B60W 30/18163 |
| 2021/0001892 A1* | 1/2021 | Yokoyama | H04W 4/46 |

FOREIGN PATENT DOCUMENTS

| | | | |
|---|---|---|---|
| JP | 2015189404 A | 11/2015 |
| JP | 2017013644 A | 1/2017 |
| KR | 101846577 B1 | 4/2018 |
| WO | 2017022474 A1 | 2/2017 |

\* cited by examiner

APPARATUS FOR CONTROLLING LANE KEEPING, VEHICLE SYSTEM HAVING THE SAME AND METHOD THEREOF

CROSS-REFERENCE TO RELATED APPLICATION

This application claims priority to and benefits of Korean Patent Application No. 10-2021-0032849 filed on Mar. 12, 2021, the entire contents of which are incorporated herein by reference.

BACKGROUND

(a) Field of the Disclosure

The present disclosure relates to a lane keeping control apparatus, a vehicle system including the same, and a method thereof, and more particularly, to a technique capable of supporting a lane replacement mode by reflecting an intention of a driver during lane keeping control.

(b) Description of the Related Art

During lane following assist (LFA) control, a target gaze distance that is proportional to a vehicle speed is set on a target path, a target turning radius for reaching that point is calculated and followed. A conventional lane-keeping control technique controls intervehicle assist maintenance by using an offset degree away from a lateral target path of the target gaze distance, and often ignores an intention of a driver since it follows and controls only a center of a road without considering a road characteristic or a driver characteristic.

The above information disclosed in this section is merely for enhancement of understanding of the background of the disclosure, and therefore, it may contain information that does not form the prior art that is already known in this country to a person of ordinary skill in the art.

SUMMARY

An exemplary embodiment of the present disclosure has been made in an effort to provide a lane keeping control apparatus, a vehicle system including the same, and a method thereof, capable of supporting a lane replacement mode that is intended by a driver by determining steering directionality of the driver and a torque value.

The technical objects of the present disclosure are not limited to the objects mentioned above, and other technical objects not mentioned can be clearly understood by those skilled in the art from the description of the claims.

An exemplary embodiment of the present disclosure provides a lane keeping control apparatus that may include: a processor configured to support a lane replacement mode by determining an intention of a driver based on a steering direction of the driver and a steering torque value of the driver during lane keeping control; and a storage configured to store data and algorithms driven by the processor.

In an exemplary embodiment, the processor may be configured to determine whether a driving road is a straight road. The processor may be configured to determine whether the intention of the driver for the lane replacement is continued. In addition, when the intention of the driver for the lane replacement is continued, the processor may be configured to calculate an offset that is a distance between a target path that is set as a center of a lane in which a host vehicle is traveling and the host vehicle.

The processor may be configured to enter the lane replacement mode when the offset is within a predetermined range. The processor may be configured to determine whether the driver steering torque is greater than a predetermined threshold when entering the lane replacement mode. In addition, the processor may be configured to maintain the target path that is set as the center of the lane in which the host vehicle is traveling when the driver steering torque is equal to or less than the predetermined threshold.

In an exemplary embodiment, the processor may be configured to calculate a difference between the driver steering torque and the threshold when the driver steering torque is greater than the predetermined threshold. The processor may be configured to calculate a target path offset for modifying the target path by using the difference between the driver steering torque and the threshold, a time when driver steering is maintained, and a difference between the target path and a current position of the host vehicle.

Further, the processor may be configured to calculate a target path offset for modifying the target path by dividing a product of the difference between the driver steering torque and the threshold and a time driver steering is maintained, by a product of the threshold and the difference between the target path and the current position of the host vehicle. The processor may be configured to modify the target path by moving it left or right by the target path offset.

Additionally, when a host vehicle is driving within a lane and driving on a straight road, the processor may be configured to determine whether a vehicle exists in a left or right lane within a predetermined distance in front. In an exemplary embodiment, the processor may be configured to determine that the intention of the driver for the lane replacement is continued when no vehicle exists in the left or right lane within the predetermined distance in front.

The processor may be configured to compare a speed of a vehicle closest to the host vehicle among vehicles existing in the left or right lane within the predetermined distance in front and a speed of the host vehicle.

In an exemplary embodiment, when the speed of the vehicle closest to the host vehicle is greater than the speed of the host vehicle, the processor may be configured to determine whether the intention of the driver for the lane replacement is continued. In addition, when the speed of the vehicle closest to the host vehicle is equal to or less than the speed of the host vehicle, the processor may be configured to determine whether the vehicle closest to the host vehicle is driving in the lane replacement mode into a host vehicle lane.

Further, the processor may be configured to determine that the intention of the driver for the lane replacement is temporary when the vehicle closest to the host vehicle is driving in the lane replacement mode into the host vehicle lane, and may be configured to determine that the intention of the driver for the lane replacement is continued when the vehicle closest to the host vehicle is not driving in the lane replacement mode into the host vehicle lane. In an exemplary embodiment, the processor may not support the lane replacement mode by determining that the intention of the driver for the lane replacement is temporary in the case of lane replacement for the host vehicle to overtake a vehicle in front or a vehicle driving in a left or right lane closest to the host vehicle.

An exemplary embodiment of the present disclosure provides a vehicle system that may include: a sensing device configured to detect lane information and front vehicle information; and a lane keeping control apparatus configured to support a lane replacement mode by determining an intention of a driver based on a steering direction of the driver and a steering torque value of the driver using a sensing result of the sensing device during lane keeping control.

An exemplary embodiment of the present disclosure provides a lane keeping control method including: detecting lane information and front vehicle information; and supporting a lane replacement mode by determining an intention of a driver based on the lane information, a steering direction of the driver, and a steering torque value of the driver during lane keeping control.

According to the present technique, it is possible to minimize unnecessary driver steering intervention by determining the steering direction of the driver and the torque value of the driver to support the lane replacement mode intended by the user. In addition, various effects that can be directly or indirectly identified through this document may be provided.

DETAILED DESCRIPTION

Figure 1:
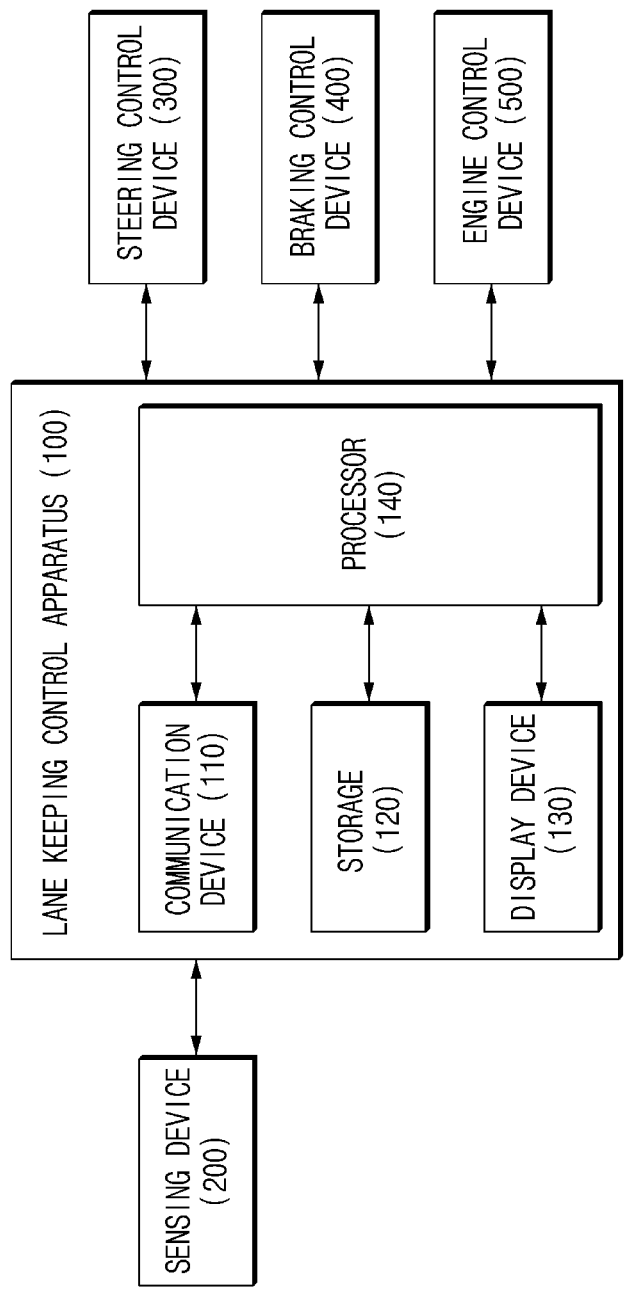
FIG. 1 illustrates a block diagram showing a configuration of a vehicle system including a lane keeping control apparatus according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 11. FIG. 1 illustrates a block diagram showing a configuration of a vehicle system including a lane keeping control apparatus 100 according to an exemplary embodiment of the present disclosure.

Referring to FIG. 1, the vehicle system according to the exemplary embodiment of the present disclosure may include a lane keeping control apparatus 100, a sensing device 200, a steering control device 300, a braking control device 400, and an engine control device 500.

The lane keeping control apparatus 100 according to the exemplary embodiment of the present disclosure may be implemented inside the vehicle. In particular, the lane keeping control apparatus 100 may be integrally formed with internal control units of the vehicle, or may be implemented as a separate device to be connected to control units of the vehicle by a separate connection means. The lane keeping control apparatus 100 may support a lane replacement mode by determining an intention of a driver based on a steering direction of the driver and a steering torque value of the driver during lane keeping control. The lane keeping control apparatus 100 of the present disclosure may be applied to a lane following assist (LFA) system.

Referring to FIG. 1, the lane keeping control apparatus 100 may include a communication device 110, a storage 120, a display device 130, and a processor 140. The communication device 110 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

In addition, the communication device 110 may be configured to perform communication by using a server, infrastructure, or third vehicles outside the vehicle, and the like through a wireless Internet access or short range communication technique. Herein, the wireless communication technique may include wireless LAN (WLAN), wireless broadband (Wibro), Wi-Fi, world Interoperability for microwave access (Wimax), etc. In addition, short-range communication technique may include Bluetooth, ZigBee, ultra wideband (UWB), radio frequency identification (RFID), infrared data association (IrDA), and the like.

As an example, the communication device 110 may be configured to share data by communicating with intervehicle devices such as the sensing device 200. In particular, the data may include forward image data, vehicle speed of an obstacle (e.g., a vehicle) in front, a position in a lane, and the like. The storage 120 may be configured to store sensing results of the sensing device 200 and data and/or algorithms required for the processor 140 to operate, and the like.

As an example, the storage 120 may be configured to store information related to a front obstacle, e.g., a preceding vehicle sensed by the sensing device 200. The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The display device 130 may include an input for receiving a control command from a user and an output for outputting an operation state of the apparatus 100 and results thereof. Herein, the input may include a key button, and may include a mouse, a joystick, a jog shuttle, a stylus pen, and the like. In addition, the input may include a soft key implemented on the display. The interface device 130 may be implemented as a head-up display (HUD), a cluster, an audio video navigation (AVN), a human machine interface (HM), a user select menu (USM).

The output device may include a display, and may also include a voice output such as a speaker. In particular, when a touch sensor formed of a touch film, a touch sheet, or a touch pad is provided on the display, the display may operate as a touch screen, and may be implemented in a form in which an input device and an output device are integrated. In the present disclosure, the output may display a target path, a changed target path, a start of lane keeping control, an end of lane keeping control, and the like. In particular, the display may include at least one of a liquid crystal display (LCD), a thin film transistor liquid crystal display (TFT LCD), an organic light emitting diode display (OLED display), a flexible display, a field emission display (FED), and a 3D display.

The processor 140 may be electrically connected to the communication device 110, the storage 120, the display device 130, and the like, may electrically control each component, and may be an electrical circuit that executes software commands, thereby performing various data processing and calculations described below. The processor 140 may be configured to process signals transferred between constituent elements of the lane keeping control apparatus 100. The processor 140 may be, e.g., an electronic control unit (ECU), a micro controller unit (MCU), or other sub-controllers mounted in the vehicle.

The processor 140 may support the lane replacement mode by determining whether the intention of the driver is continued based on the steering direction of the driver and the steering torque value of the driver during lane keeping control. The processor 140 may be configured to determine whether a driving road is a straight road, and determine whether the driver intention for lane replacement is continued.

The processor 140 may be configured to determine whether a vehicle exists in a left or right lane within a predetermined distance in front when a host vehicle is driving in a lane and driving on a straight road. The processor 140 may not support the lane replacement mode for safety when the host vehicle is driving on a road without a lane or driving on a curved line. The processor 140 may be configured to determine that the driver intention for the lane replacement is continued when no vehicle exists in the left or right lane within the predetermined distance in front. In particular, the distance may be determined in advance by experimental values. In addition, when there is no vehicle in the left or right lane within a predetermined distance in front, there is no need for the host vehicle to overtake, to thus determine that the driver temporarily desires lane replacement for overtaking.

When a vehicle exists or is present in the left or right lane within the predetermined distance in front, the processor 140 may be configured to compare a speed of a vehicle closest to the host vehicle among vehicles existing in the left or right lane within the predetermined distance in front and a speed of the host vehicle. When the speed of the vehicle closest to the host vehicle is greater than the speed of the host vehicle, the processor 140 may be configured to determine that the driver intention for the lane replacement is continued. When the speed of the vehicle closest to the host vehicle is equal to or less than the speed of the host vehicle, the processor 140 may be configured to determine whether the vehicle closest to the host vehicle is driving in a lane replacement mode into a host vehicle lane.

Figure 2:
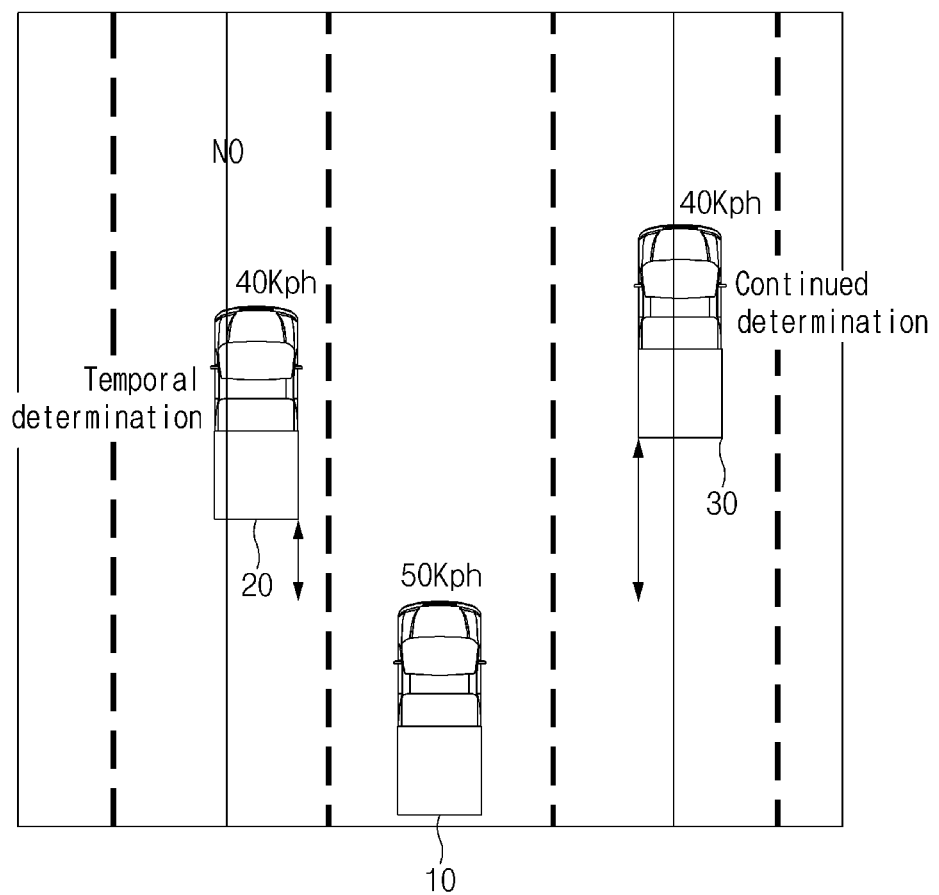
FIG. 2 illustrates an example of a screen for describing whether an intention of a driver is continued according to an exemplary embodiment of the present disclosure.

The processor 140 may be configured to determine that the driver intention for the lane replacement is temporary when the vehicle closest to the host vehicle is driving in the lane replacement mode into the host vehicle lane, and may determine that the driver intention for the lane replacement is continued when the vehicle closest to the host vehicle is not driving in the lane replacement mode into the host vehicle lane. FIG. 2 illustrates an example of a screen for describing whether an intention of a driver is continued according to an exemplary embodiment of the present disclosure. Referring to FIG. 2, for example, when the host vehicle 10 is driving at about 50 Kph, a front left vehicle 20 is driving at about 40 Kph or is driving in the lane replacement mode close to the host vehicle 10, the lane keeping control apparatus 100 may be configured to determine that the driver of the host vehicle 10 wants to temporarily drive it in the lane replacement mode. When a vehicle speed of a vehicle 30 driving in a right lane of the host vehicle 10 is about 40 Kph, which is less than the vehicle speed of the host vehicle 10, and the vehicle 30 is not driving in the lane replacement mode close to the own or subject vehicle 10, the lane keeping control apparatus 100 may be configured to determine that the driver of the host vehicle 10 continuously desires the lane replacement.

Accordingly, in the case of lane replacement for the host vehicle to overtake a vehicle in front or a vehicle driving in a left or right lane closest to the host vehicle, the processor 140 may not support the lane replacement mode by determining that the driver intention for the lane replacement is temporary. When the driving road is a straight road and the driver intention is continued, the processor 140 may be configured to calculate an offset that is a distance between the target path set as the center of the lane of the lane in which the host vehicle is traveling and the host vehicle. The processor 140 may be configured to enter the lane replacement mode when the offset is within a predetermined range.

When entering the lane replacement mode, the processor 140 may be configured to determine whether the driver steering torque is greater than a predetermined threshold value. In particular, the threshold may be determined in advance by experimental values. When the driver steering torque is equal to or less than a predetermined threshold, the processor 140 may be configured to maintain a target path C0 set as a center of the lane in which the host vehicle is traveling. When the driver steering torque is greater than the predetermined threshold, the processor 140 may be configured to calculate a difference value (Tq−threshold) between the driver steering torque and the threshold.

The processor 140 may be configured to calculate a target path offset for modifying the target path as shown in Equation 1 below by using a difference between the driver steering torque and the threshold, a time when the driver maintains the steering, and a difference between the target path and a current position of the host vehicle.

$$\text{Target path offset}(TqOffset) = (Tq - \text{threshold}) * Ts(\text{time})/\text{threshold} * (C1 - C0) \quad \text{Equation 1}$$

As in Equation 1, the processor 140 may be configured to calculate the target path offset for modifying the target path by dividing a product of the difference between the driver steering torque and the threshold by the time the driver steering is maintained, by a product of the threshold and the difference between the target path and the current position of the host vehicle.

Figure 3A:
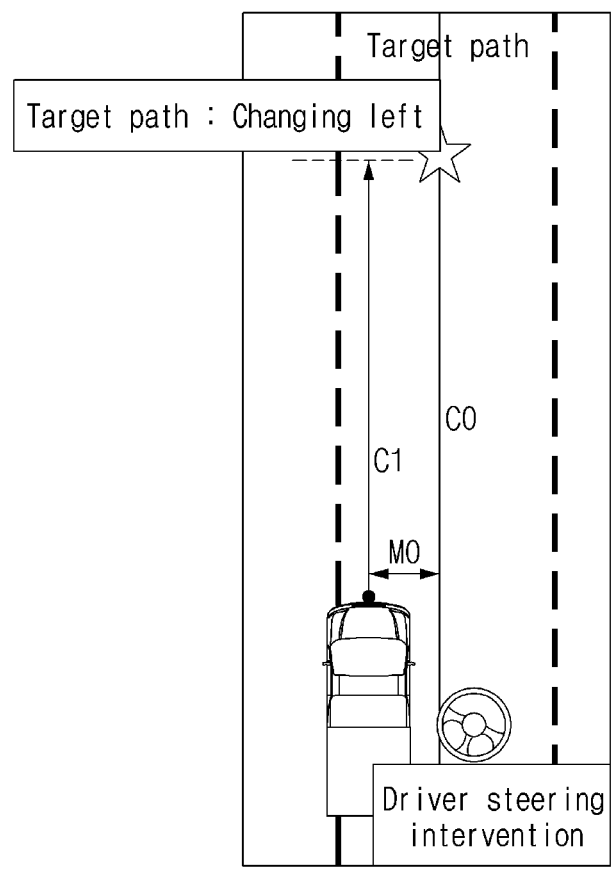
FIG. 3A and FIG. 3B illustrate examples of a screen for changing a target path to a left side according to an exemplary embodiment of the present disclosure.
Figure 3B:
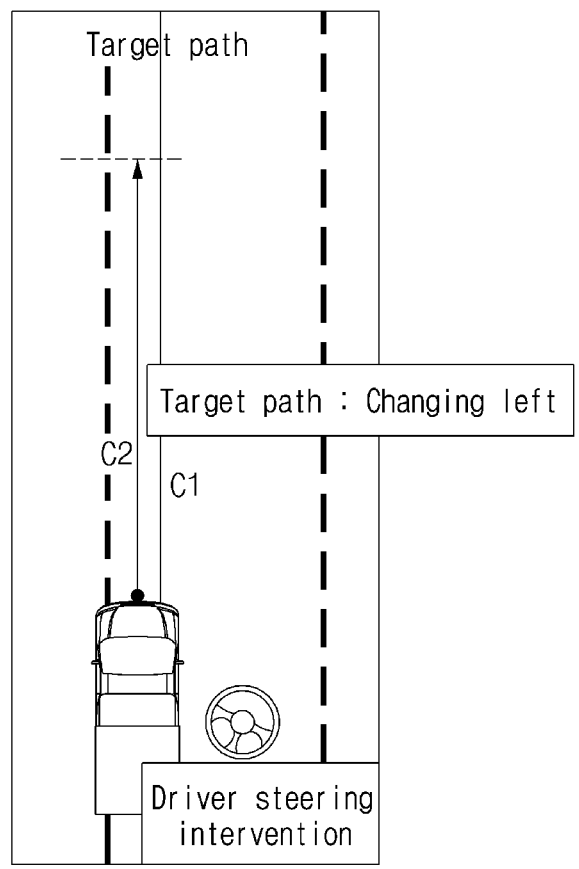

The processor 140 may be configured to modify the target path by moving it left or right by the target path offset. FIG. 3A and FIG. 3B illustrate examples of a screen for changing a target path to a left side according to an exemplary embodiment of the present disclosure, and FIG. 4A and FIG. 4B illustrate examples of a screen for changing a target path to a right side according to an exemplary embodiment of the present disclosure.

Referring to FIG. 3A, the lane keeping control apparatus 100 may be configured to set a center road within a lane as the target path C0 at an initial stage of lane keeping control. Next, when driver steering intervention occurs, that is, when a driver attempts to change it to the left, the lane keeping control apparatus 100 moves the target path C0 to the left by MO to set a new target path C1. In particular, the target path C1 is a path biased to the left rather than the center in the lane. Referring to FIG. 3B, it can be seen that a new target path C2 is set by once again moving the changed target path C1 to the left as shown in FIG. 3A.

Figure 4A:
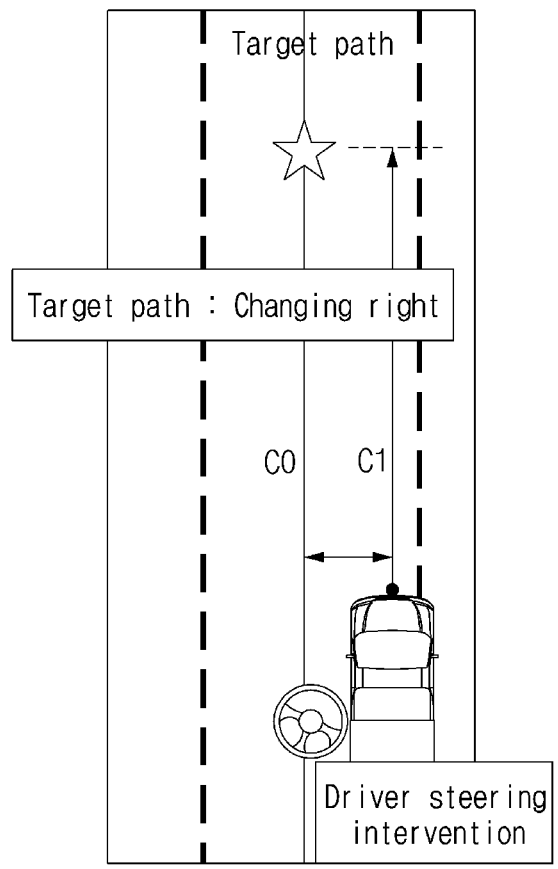
FIG. 4A and FIG. 4B illustrate examples of a screen for changing a target path to a right side according to an exemplary embodiment of the present disclosure.
Figure 4B:
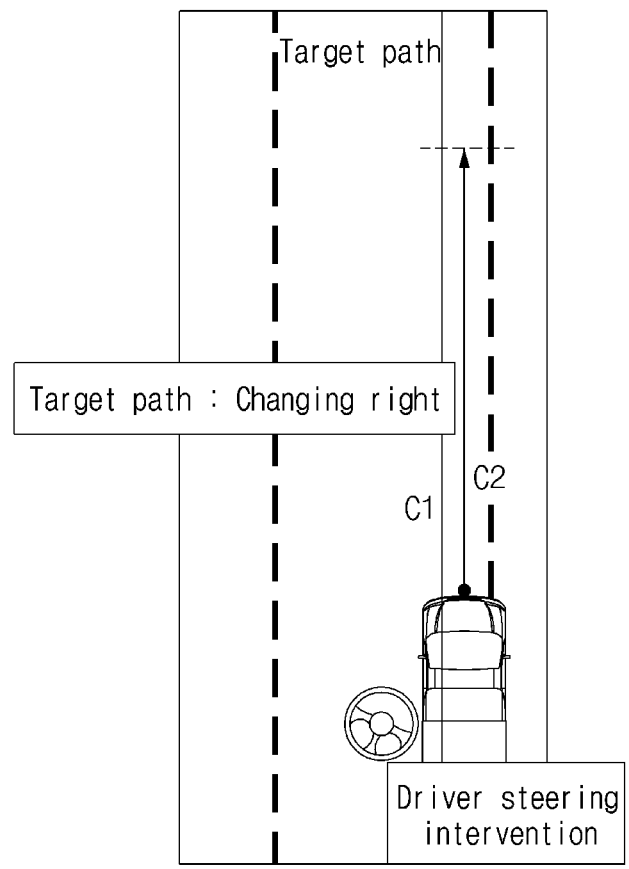

Referring to FIG. 4A, the lane keeping control apparatus 100 may be configured to set a center road within a lane as the target path C0 at an initial stage of lane keeping control. Next, when driver steering intervention occurs, that is, when the driver attempts to change it to the right, the lane keeping control apparatus 100 moves the target path C0 to the left to set a new target path C1. In particular, the target path C1 is a path biased to the right rather than the center in the lane. Referring to FIG. 4B, it can be seen that a new target path C2 is set by once again moving the changed target path C1 to the right as shown in FIG. 3A.

The sensing device 200 may include one or more sensors that sense an obstacle, e.g., a preceding vehicle, positioned around the host vehicle and measure a distance with the obstacle and/or a relative speed thereof. The sensing device 200 may include a plurality of sensors to sense an external object of the vehicle, to obtain information related to a position of the external object, a speed of the external object, a moving direction of the external object, and/or a type of the external object (e.g., vehicles, pedestrians, bicycles or motorcycles, etc.). Accordingly, the sensing device 200 may include a camera, an ultrasonic sensor, a radar, a laser scanner, and/or a corner radar, a lidar, an acceleration sensor, a yaw rate sensor, a torque measurement sensor and/or a wheel speed sensor, a steering angle sensor, etc. In the present disclosure, the front camera may be used to photograph the front to provide it to the processor 140. Accordingly, the processor 140 may be configured to acquire lane information, position information of vehicles preceding in the lane, and the like, from the image data obtained by photographing the front.

The steering control device 300 may be configured to adjust a steering angle of a vehicle, and may include a steering wheel, an actuator interlocked with the steering wheel, and a controller controlling the actuator. The braking control device 400 may be configured to adjust braking of the vehicle, and may include a controller configured to operate a brake thereof. The engine control device 500 may be configured to control engine driving of a vehicle, and may include a controller configured to adjust a speed of the vehicle.

Figure 5:
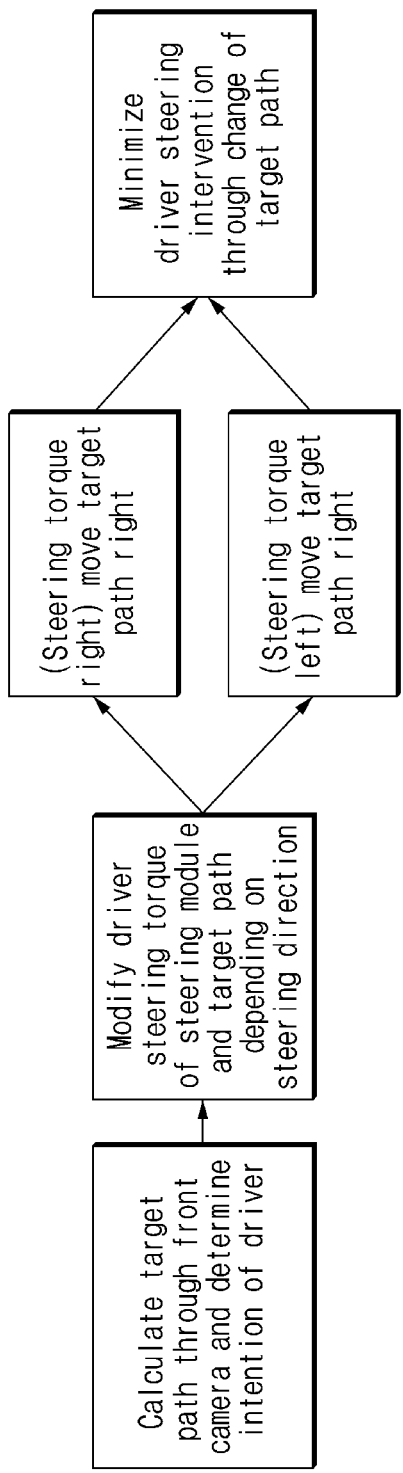
FIG. 5 illustrates a flowchart showing a lane keeping control process according to an exemplary embodiment of the present disclosure.

FIG. 5 illustrates a flowchart showing a lane keeping control process according to an exemplary embodiment of the present disclosure. Referring to FIG. 5, the lane keeping control apparatus 100 may be configured to calculate a target path based on image data acquired through a front camera and determine an intention of a driver. In other words, the lane keeping control apparatus 100 may be configured to determine whether the driver desires continuous lane replacement or the intention of surrounding circumstances (e.g., overtaking of the vehicle in front, lane replacement of the vehicle in front, etc.).

In response to determining that there is a driver continuous lane replacement intention, the lane keeping control apparatus 100 moves and modifies the target path to the right or left depending on the driver steering torque and steering direction. Accordingly, the lane keeping control apparatus 100 may minimize the driver steering intervention by controlling the vehicle to drive depending on the modified target path.

Figure 6A:
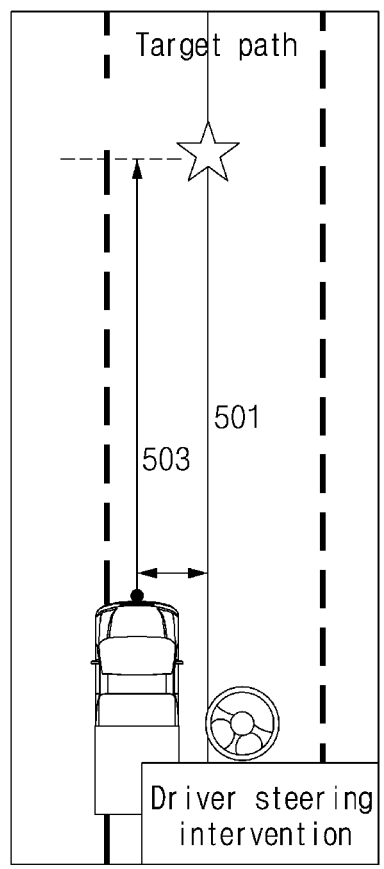
FIG. 6A and FIG. 6B respectively illustrate an example of a screen during driver override and a graph showing a torque value according to an exemplary embodiment of the present disclosure.
Figure 6B:
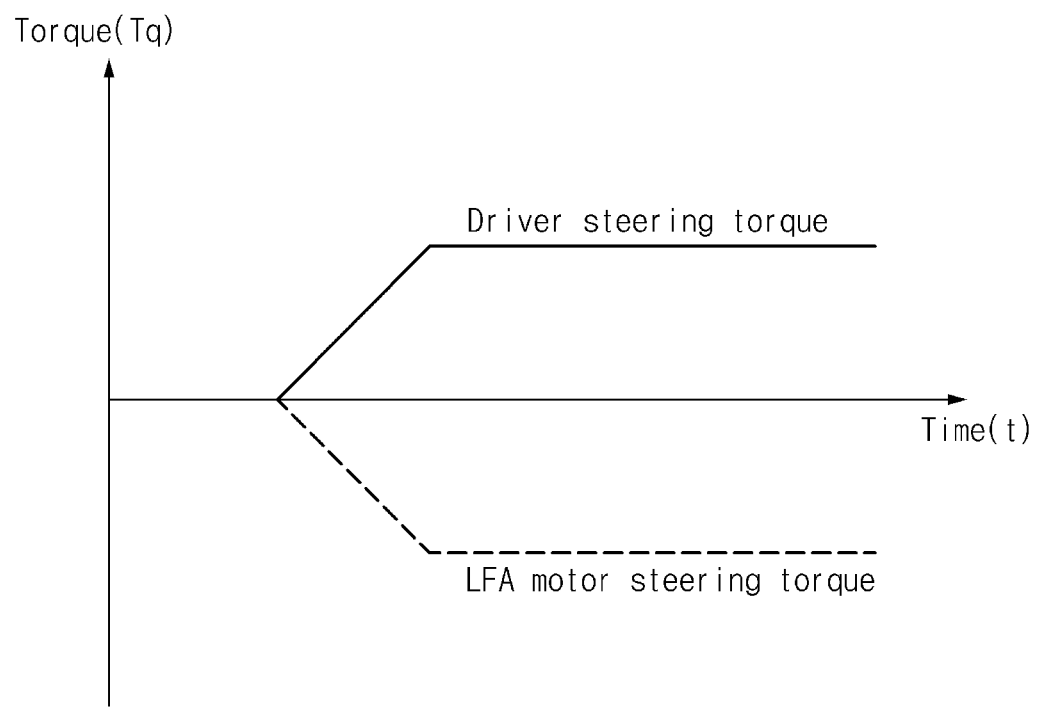

FIG. 6A and FIG. 6B respectively illustrate an example of a screen during driver override and a graph showing a torque value according to an exemplary embodiment of the present disclosure. Referring to FIG. 6A, the target path 501 by the lane keeping control apparatus 100 and the target path 503 by the driver steering control are different, and referring to FIG. 6B, it can be seen that the difference between the driver steering torque and the LFA steering torque is large.

Figure 7A:
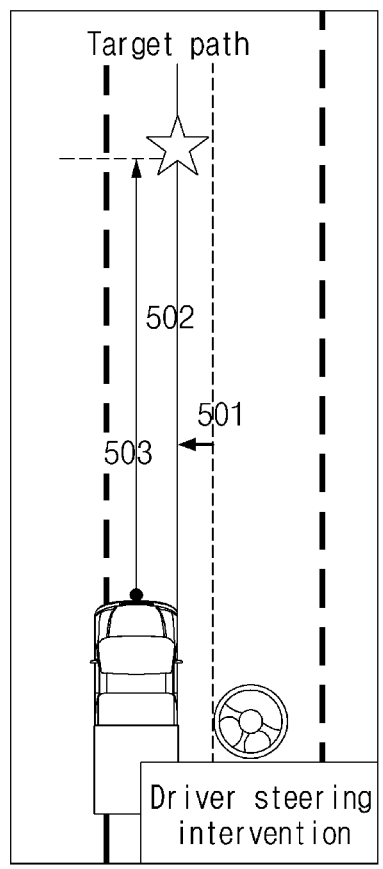
FIG. 7A and FIG. 7B respectively illustrate an example of a screen and a graph showing a torque value when a target path is modified but the target path and a driver intention path are different from each other according to an exemplary embodiment of the present disclosure.
Figure 7B:
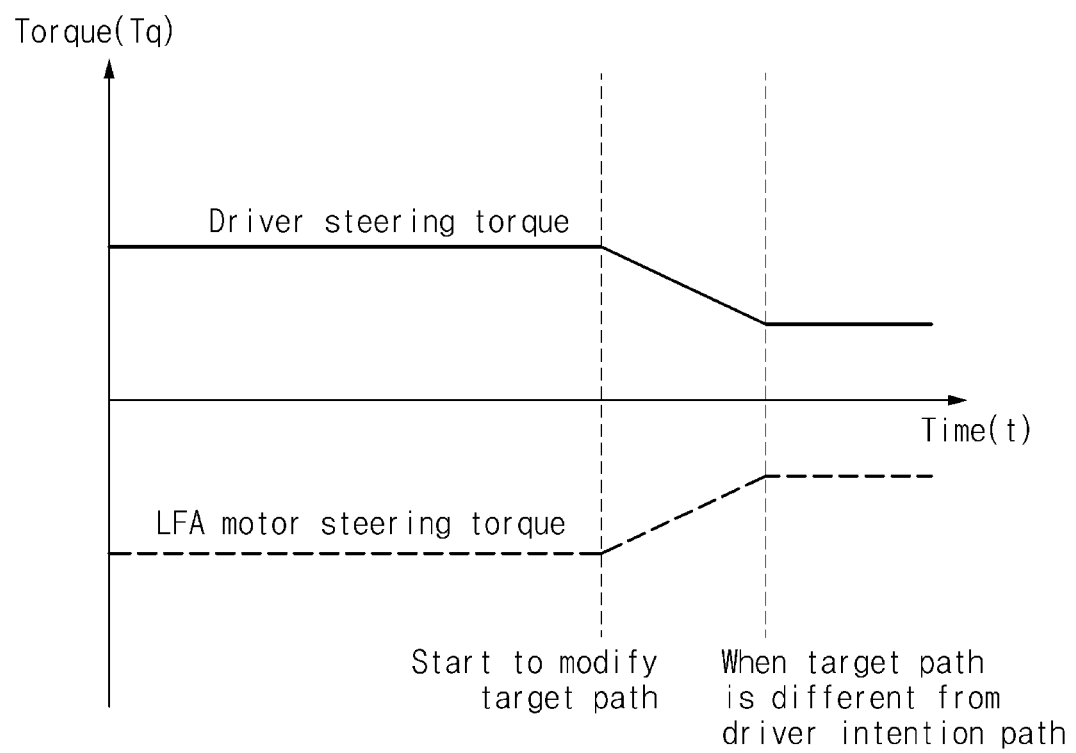

FIG. 7A and FIG. 7B respectively illustrate an example of a screen and a graph showing a torque value when a target path is modified but the target path and a driver intention path are different from each other according to an exemplary embodiment of the present disclosure. Referring to FIG. 7A, when the target path 501 by the lane keeping control device 100 starts to be modified, the path 502 close to the target path 503 by the driver steering is modified, and referring to FIG. 7B, it can be seen that a difference between the driver steering torque and the LFA steering torque is less than that of FIG. 6B.

Figure 8A:
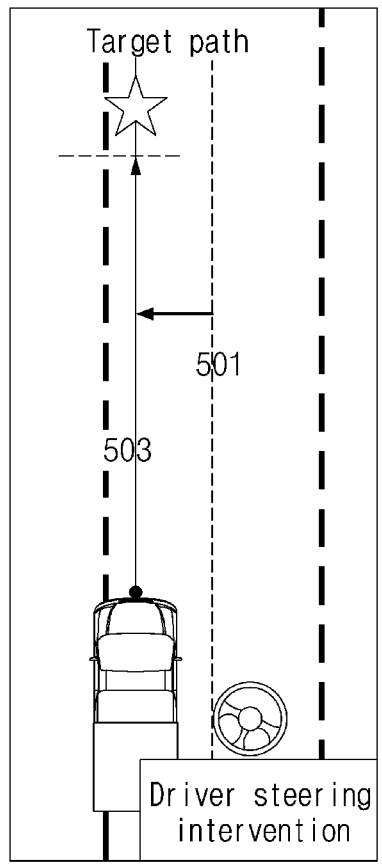
FIG. 8A and FIG. 8B respectively illustrate an example of a screen and a graph showing a torque value when a target path and a driver intention path match by modifying the target path according to an exemplary embodiment of the present disclosure.
Figure 8B:
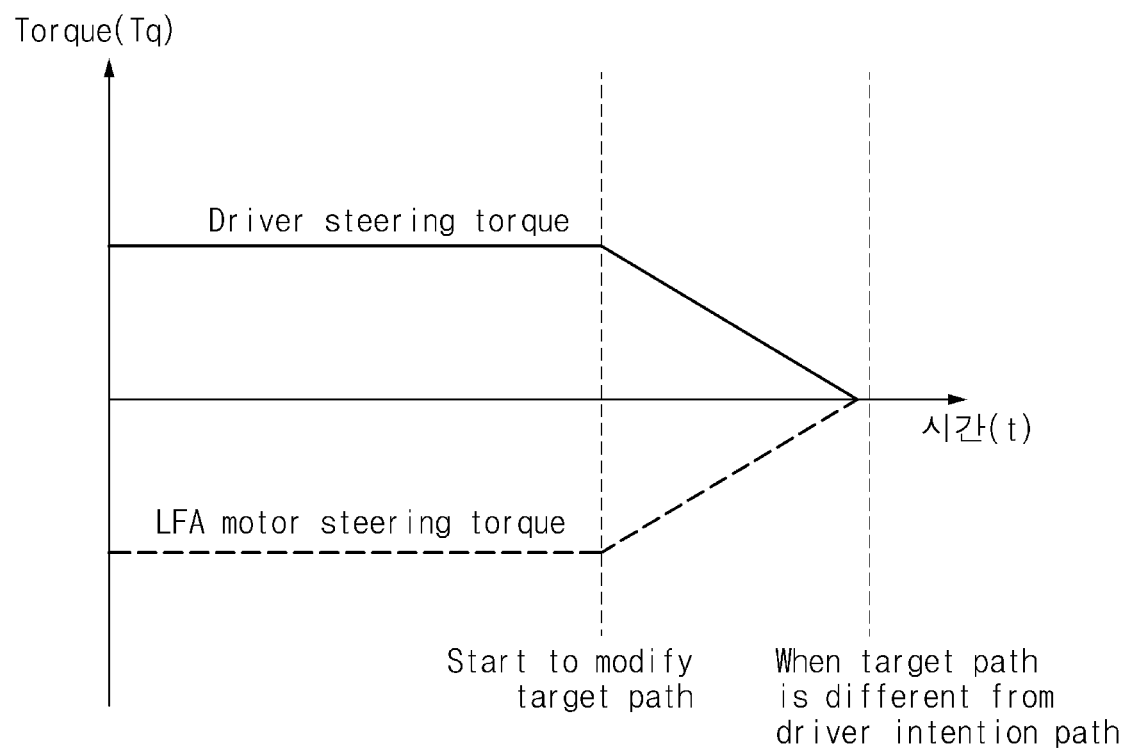

FIG. 8A and FIG. 8B respectively illustrate an example of a screen and a graph showing a torque value when a target path and a driver intention path match by modifying the target path according to an exemplary embodiment of the present disclosure. Referring to FIG. 8A, when the modification of the target path 501 by the lane keeping control apparatus 100 is completed, the target path 503 by the driver steering coincides with the target path 501. Referring to FIG. 8B, it can be seen that the driver steering torque and the LFA steering torque match.

Accordingly, in the case of the conventional lane keeping control apparatus, after creating a central road within the lane as the target path, it follows only the center of the road without considering the driver characteristic, so the drivers intervention in the lateral steering frequently occurs, while according to the present disclosure, frequent lateral steering intervention may be minimized by supporting the lane replacement mode intended by a driver and reflecting the driver intention, to perform stable lane keeping control.

Figure 9:
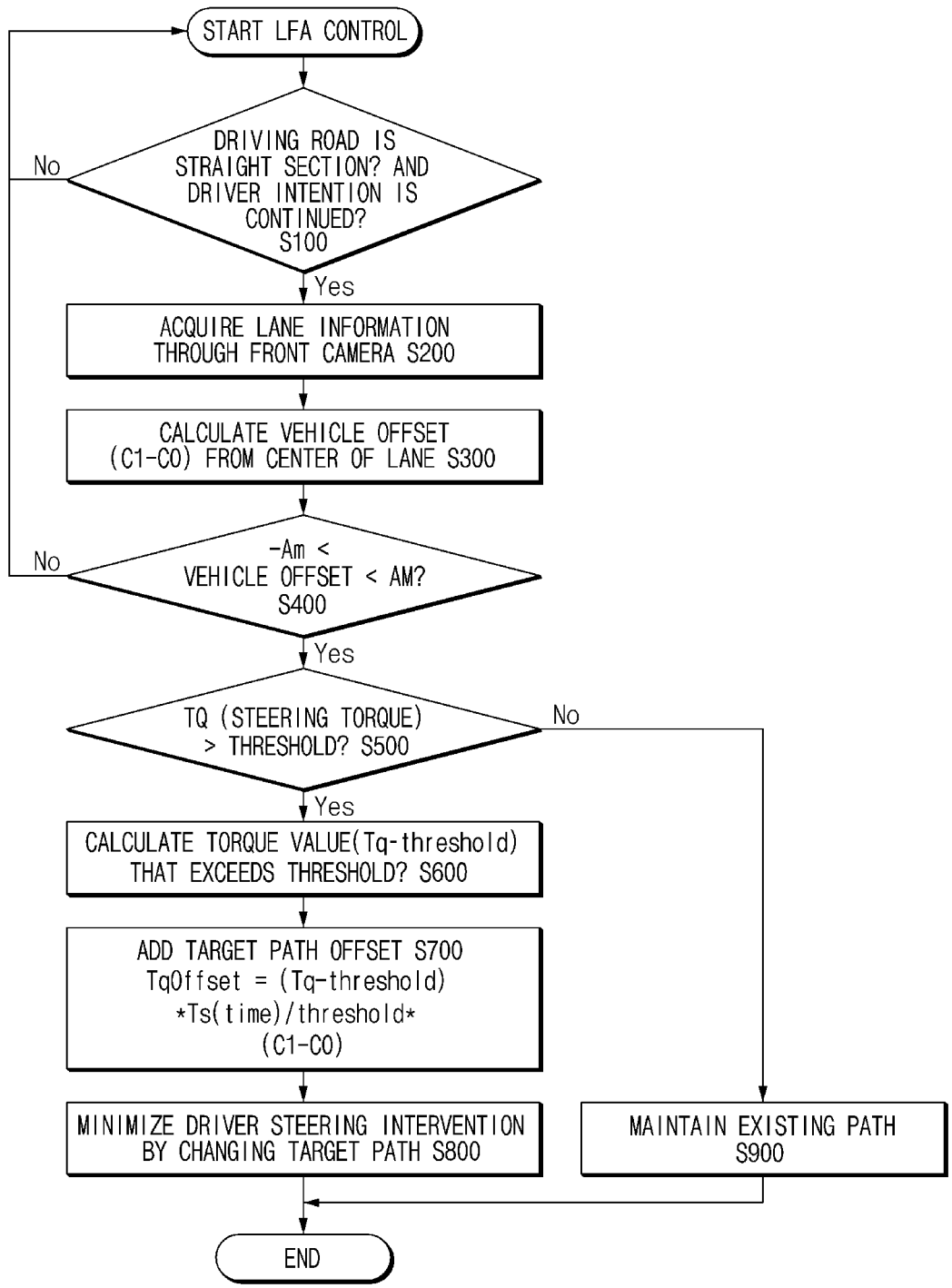
FIG. 9 illustrates a flowchart showing a lane keeping control method according to an exemplary embodiment of the present disclosure.
Figure 10:
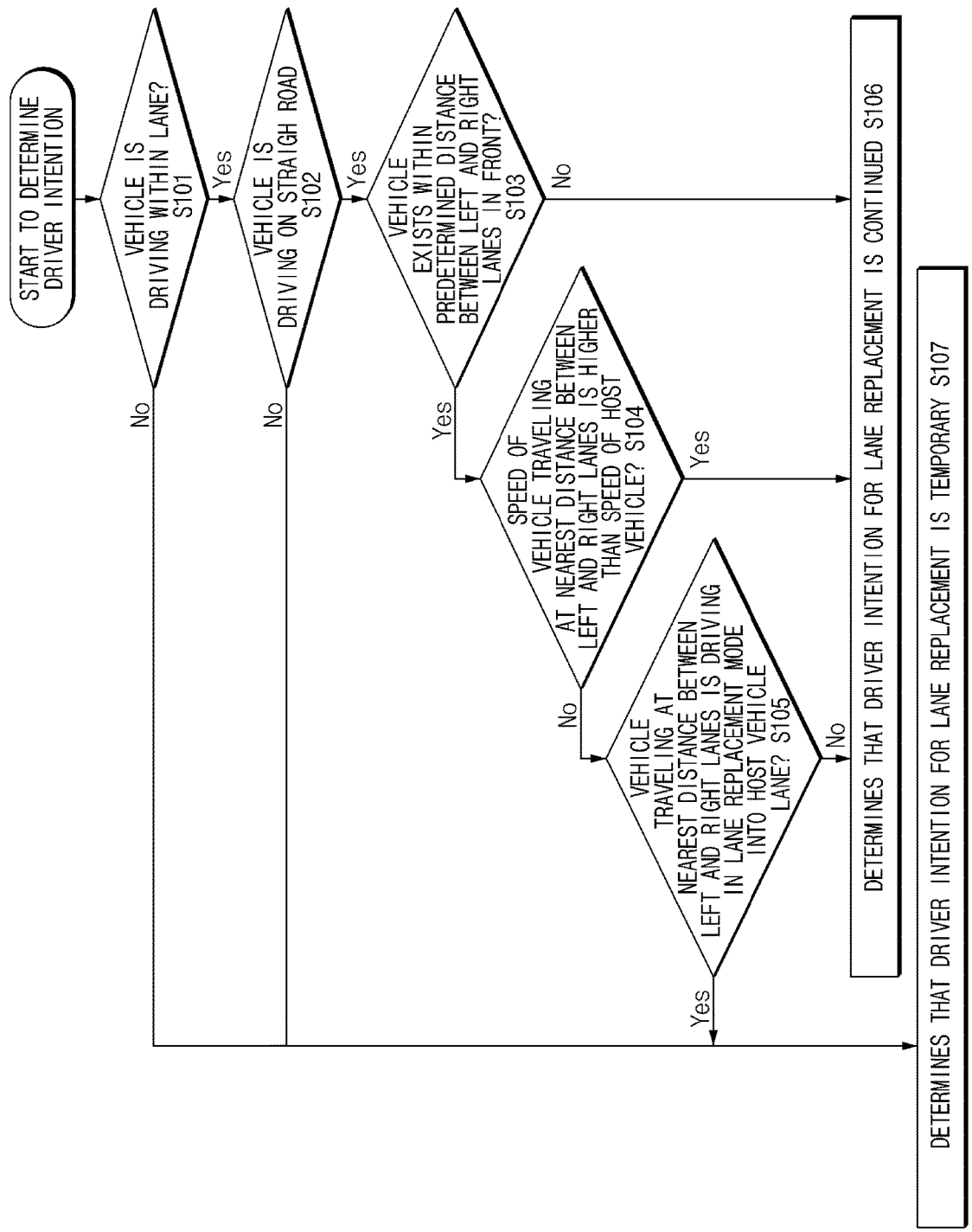
FIG. 10 illustrates a flowchart showing a method of determining whether an intention of a driver is continued according to an exemplary embodiment of the present disclosure.

Hereinafter, a lane keeping control method according to an exemplary embodiment of the present disclosure will be described in detail with reference to FIG. 9 and FIG. 10. FIG. 9 illustrates a flowchart showing a lane keeping control method according to an exemplary embodiment of the present disclosure. FIG. 10 illustrates a flowchart showing a method of determining whether an intention of a driver for lane replacement is continued according to an exemplary embodiment of the present disclosure.

Hereinafter, it is assumed that the lane keeping control apparatus 100 of FIG. 1 performs the processes of FIG. 9 and FIG. 10. In addition, in the description of FIG. 9 and FIG. 10, operations described as being performed by the device may be understood as being controlled by the processor 140 of the lane keeping control apparatus 100 for the vehicle.

Referring to FIG. 9, the lane keeping control apparatus 100 starts lane following assist (LFA) and may be configured to determine whether the driving road is a straight section or the driver intention for lane replacement is continued (S100). A method of determining whether the driving road is a straight section or the driver intention is continued will be described in detail later with reference to FIG. 10.

When the driving road is the straight section and the driver intention is continued, the lane keeping control apparatus 100 may be configured to obtain lane information by using a front camera (S200). In other words, the lane keeping control apparatus 100 may be configured to extract the lane information from image data of the front captured by the front camera. The lane keeping control apparatus 100 may be configured to recognize or detect both lanes from lane information obtained through the front camera, obtains the center of a lane from the lanes, and sets the center of the lane as a target path. Next, the lane keeping control apparatus 100 may be configured to calculate a vehicle offset C1−C0, which is a difference between the current vehicle position and the center of the lane (target path) (S300).

The lane keeping control apparatus 100 may be configured to determine whether the vehicle offset from the target path satisfies a predetermined range (−Am<vehicle offset<Am) (S400). In particular, the lane keeping control apparatus 100 does not support the lane replacement mode when the vehicle offset is out of a predetermined range, but supports the lane replacement mode when the vehicle offset is within the predetermined range. For example, A may be 1.0.

Next, the lane keeping control apparatus 100 may be configured to determine whether a driver steering torque Tq exceeds a threshold when the predetermined range is satisfied (S500). When the driver steering torque exceeds the threshold, the lane keeping control apparatus 100 may be configured to calculate a torque value (Tq−threshold) that exceeds the threshold (S600), and calculate the target path offset by using the torque value (Tq−threshold) exceeding the threshold to reflect the target path to move by the target path offset (S700). In particular, the lane keeping control apparatus 100 gradually moves the target path C0 as shown in Equation 1 without moving directly to a driver intention path C1 by the driver steering control.

When the steering torque from the target path is greater than the threshold (Tq>threshold), the lane keeping control apparatus 100 may be configured to calculate the target path offset as in Equation 1 described above. In other words, the lane keeping control apparatus 100 may be configured to calculate a target path offset TqOffset by dividing a product of the torque value exceeding the threshold (Tq−threshold) by a time Ts taken by a product of the threshold and the difference value (C1−C0) between the target path C0 and the driver intention path C1.

The lane keeping control apparatus 100 may move the target path by the target path offset calculated as in Equation 1. Accordingly, the lane keeping control apparatus 100 may minimize the driver steering intervention by changing the target path by the target path offset (S800). On the other hand, when the offset from the target path is less than or equal to the threshold (c0≤threshold), the target path offset is maintained as a previous value to maintain an existing path without changing the target path (S900). Accordingly, a target path reflecting the driver intention may be generated by continuously changing the target path on a straight road, to minimize the driver steering intervention.

Hereinafter, a process in which the lane keeping control apparatus 100 determines whether the driver's intention of step S100 of FIG. 9 is continued will be described with reference to FIG. 10. The lane keeping control apparatus 100 may be configured to determine whether the vehicle is currently driving within a lane (S101). When the vehicle is currently driving within the lane, the lane keeping control apparatus 100 may be configured to determine whether the vehicle is currently driving on the straight road (S102).

When the vehicle is not driving in the lane or the driving road is not the straight road, the lane keeping control apparatus 100 may be configured to determine that the driver intention for lane replacement is temporary (S107). In other words, the lane keeping control apparatus 100 may be configured to determine that the driver temporarily desires lane replacement but does not want continuous lane replacement. In the present disclosure, it is determined whether the driver continuously desires lane replacement, and when the driver continuously desires the lane replacement, the lane replacement be supported.

When a vehicle is traveling on the straight road, the lane keeping control apparatus 100 may be configured to determine whether the vehicle exists within a predetermined distance (e.g., 30 m) between the left and right lanes in front (S103). In particular, the lane keeping control apparatus 100 may be configured to determine whether there is a vehicle in front based on a sensing result of the sensing apparatus 200. When the vehicle does not exist within the predetermined distance between the left and right lanes in front, the lane keeping control apparatus 100 may be configured to determine that the driver intention for the lane replacement is continued (S107). In other words, the vehicle does not exist in the left and right lanes in front, the lane keeping control apparatus 100 may be configured to determine that the driver continuously desires the lane replacement instead of the temporary the lane replacement for overtaking the vehicle in front.

When a vehicle exists within a predetermined distance between the left and right lanes in front, the lane keeping control apparatus 100 may be configured to determine whether a speed of a vehicle traveling at a nearest distance (a closest point) among vehicles existing within the predetermined distance between the left and right lanes in front is higher than the speed of the host vehicle (S104). When the speed of the vehicle traveling in the nearest distance (closest) is greater than the speed of the host vehicle, the lane keeping control apparatus 100 may be configured to determine that the driver intention for the lane replacement is continued (S106).

In response to determining that the speed of the closest vehicle is less than or equal to the speed of the host vehicle, the lane keeping control apparatus 100 may be configured to determine whether the closest vehicle is driving in the lane replacement mode into the host vehicle lane (S105). When the closest vehicle is driving in the lane replacement mode into the host vehicle lane, the lane keeping control apparatus 100 may be configured to determine that the driver intention for lane replacement is continued (S106).

On the other hand, when the closest vehicle is not driving in the lane replacement mode into the host vehicle lane, the lane keeping control apparatus 100 may be configured to determine that the driver intention for lane replacement is temporary (S107). Accordingly, the lane keeping control apparatus 100 may be configured to detect a case in which the driver temporarily desires lane replacement for overtaking a vehicle in front, and may not support the lane replacement mode when the driver temporarily desires the lane replacement.

Figure 11:
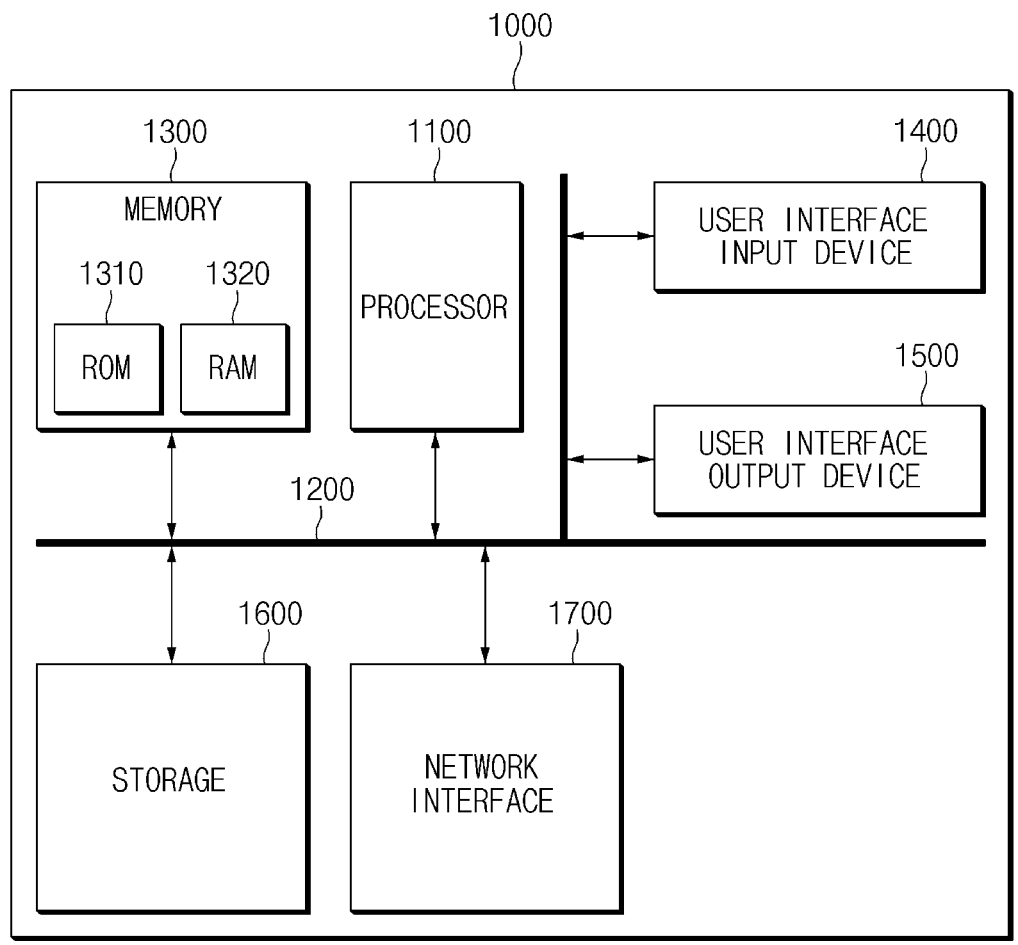
FIG. 11 illustrates a computing system according to an exemplary embodiment of the present disclosure.

FIG. 11 illustrates a computing system according to an exemplary embodiment of the present disclosure. Referring to FIG. 11, the computing system 1000 may include at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure. Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A lane keep control apparatus for a vehicle, comprising:
a processor configured to control a lane replacement mode by determining an intention of a driver to change a lane based on a steering direction of the driver and a steering torque value of the driver during lane keeping control; and
a storage configured to store data and algorithms driven by the processor,
wherein the processor is configured to control the lane replacement mode of the vehicle by moving a target path for the vehicle by a certain distance from a center of the lane in which the vehicle is traveling when the processor determines that the driver intends to change the lane, wherein the processor is configured to, when a driving road is straight, and the intention of the driver to change the lane is continued:
  set the center of the lane as the target path,
  determine a vehicle offset, which a difference between a current position of the vehicle and the center of the lane, and
  when the vehicle offset from the target path satisfies a predetermined range, move the target path by the vehicle offset and continue driving according to the target path as move, or when the vehicle offset from the target path does not satisfy the predetermined range, control the vehicle to follow the center of the lane, and
wherein the processor does not control the lane replacement mode by determining that the intention of the driver for the lane replacement is temporary when the vehicle overtakes an additional vehicle in front or a vehicle driving in a left or right lane closest to the vehicle.

2. The lane keeping control apparatus of claim 1, wherein the processor is configured to determine whether the driver steering torque is greater than a predetermined threshold when entering the lane replacement mode.

3. The lane keeping control apparatus of claim 2, wherein the processor is configured to maintain the target path that is set as the center of the lane in which the vehicle is traveling when the driver steering torque is equal to or less than the predetermined threshold.

4. The lane keeping control apparatus of claim 2, wherein the processor is configured to calculate a difference between the driver steering torque and the threshold when the driver steering torque is greater than the predetermined threshold.

5. The lane keeping control apparatus of claim 4, wherein the processor is configured to calculate a target path offset for modifying the target path by using the difference between the driver steering torque and the threshold, a time when driver steering is maintained, and a difference between the target path and the current position of the vehicle.

6. The lane keeping control apparatus of claim 4, wherein the processor is configured to calculate a target path offset for modifying the target path by dividing a product of the difference between the driver steering torque and the threshold and a time driver steering is maintained, by a product of the threshold and the difference between the target path and the current position of the vehicle.

7. The lane keeping control apparatus of claim 5, wherein the processor is configured to modify the target path by moving it left or right by the target path offset.

8. The lane keeping control apparatus of claim 1, wherein the processor, when the vehicle is driving within the lane and driving on a straight road, is configured to determine whether an additional vehicle exists in a left or right lane within a predetermined distance in front.

9. The lane keeping control apparatus of claim 8, wherein the processor is configured to determine that the intention of the driver for the lane replacement is continued when no additional vehicle exists in the left or right lane within the predetermined distance in front.

10. The lane keeping control apparatus of claim 9, wherein the processor is configured to compare a speed of an additional vehicle closest to the vehicle among vehicles existing in the left or right lane within the predetermined distance in front and a speed of the vehicle when the additional vehicle exists in the left or right lane within the predetermined distance in front.

11. The lane keeping control apparatus of claim 10, wherein the processor, when the speed of the additional vehicle closest to the vehicle is greater than the speed of the vehicle, is configured to determine whether the intention of the driver for the lane replacement is continued.

12. The lane keeping control apparatus of claim 10, wherein the processor, when the speed of the additional vehicle closest to the host vehicle is equal to or less than the speed of the vehicle, is configured to determine whether the additional vehicle closest to the vehicle is changing lanes into a vehicle lane.

13. The lane keeping control apparatus of claim 12, wherein the processor is configured to:
  determine that the intention of the driver for the lane replacement is temporary when the additional vehicle closest to the vehicle is changing lanes into the vehicle lane, and
  determine that the intention of the driver for the lane replacement is continued when the additional vehicle closest to the vehicle is not changing lanes into the vehicle lane.

14. A vehicle system, comprising:
a sensing device configured to detect lane information and front vehicle information; and
a lane keeping control apparatus of a vehicle including a processor and a storage, the processor configured to control a lane replacement mode by determining an intention of a driver to change a lane based on a steering direction of the driver and a steering torque value of the driver by using a sensing result of the sensing device during lane keeping control,
wherein the processor is configured to control the lane replacement mode of the vehicle by moving a target path for the vehicle by a certain distance from a center of the lane in which the vehicle is traveling when the processor determines that the driver intends to change the lane,
wherein the processor is configured to, when a driving road is straight, and the intention of the driver to change the lane is continued:
  set the center of the lane as the target path,
  determine a vehicle offset, which a difference between a current position of the vehicle and the center of the lane, and
  when the vehicle offset from the target path satisfies a predetermined range, move the target path by the vehicle offset and continue driving according to the target path as move, or when the vehicle offset from the target path does not satisfy the predetermined range, control the vehicle to follow the center of the lane, and
wherein the processor does not control the lane replacement mode by determining that the intention of the driver for the lane replacement is temporary when the vehicle overtakes an additional vehicle in front or a vehicle driving in a left or right lane closest to the vehicle.

15. A lane keeping control method for a vehicle, comprising:
detecting, by a controller, lane information and front vehicle information; and
controlling, by the controller, a lane replacement mode by determining an intention of a driver to change a lane based on the lane information, a steering direction of the driver, and a steering torque value of the driver during lane keeping control, wherein the controller is configured to control the lane replacement mode of the vehicle by moving a target path for the vehicle by a certain distance from a center of the lane in which the vehicle is traveling when the processor determines that the driver intends to change the lane, wherein the processor is configured to, when a driving road is straight, and the intention of the driver to change the lane is continued:

set the center of the lane as the target path, determine a vehicle offset, which a difference between a current position of the vehicle and the center of the lane, and when the vehicle offset from the target path satisfies a predetermined range, move the target path by the vehicle offset and continue driving according to the target path as move, or when the vehicle offset from the target path does not satisfy the predetermined range, control the vehicle to follow the center of the lane, and wherein the processor does not control the lane replacement mode by determining that the intention of the driver for the lane replacement is temporary when the vehicle overtakes an additional vehicle in front or a vehicle driving in a left or right lane closest to the vehicle.

* * * * *